United States Patent [19]

Kuhfuss et al.

[11] Patent Number: 4,459,400

[45] Date of Patent: Jul. 10, 1984

[54] POLY(ESTER-AMIDE) COMPOSITIONS

[75] Inventors: Herbert F. Kuhfuss; Winston J. Jackson, Jr., both of Kingsport, Tenn.

[73] Assignee: Eastman Kodak Company, Rochester, N.Y.

[21] Appl. No.: 560,482

[22] Filed: Dec. 12, 1983

[51] Int. Cl.³ .............................................. C08G 69/44
[52] U.S. Cl. ...................................... 528/289; 528/302
[58] Field of Search ........................ 528/289, 279, 302

[56] References Cited

U.S. PATENT DOCUMENTS 4,096,123 6/1978 Niinami et al. ...................... 528/289
4,433,117 2/1984 Takayanagi et al. ........... 528/289 X Primary Examiner—Lucille M. Phynes
Attorney, Agent, or Firm—William P. Heath, Jr.; Daniel B. Reece, III

[57] ABSTRACT

Poly(ester-amides) derived from piperazine, aliphatic acids, and aliphatic glycols. The poly(ester-amides) are particularly useful as coextrudable adhesive resins for use in fabricating multilayer packaging materials, both sheet and pipe forms, comprising polyesters and ethylene/vinyl alcohol copolymers.

12 Claims, No Drawings

POLY(ESTER-AMIDE) COMPOSITIONS

DESCRIPTION

TECHNICAL FIELD

This invention relates to novel aliphatic poly(ester-amide) compositions which are useful as adhesives for polyesters and ethylene/vinyl alcohol copolymers. The poly(ester-amides) are derived from piperazine, aliphatic acids, and aliphatic glycols. The poly(ester-amides) of this invention are particularly useful as coextrudable adhesive resins for use in fabricating multilayer packaging materials, both sheet and pipe forms, the packaging materials comprising polyesters and ethylene/vinyl alcohol copolymers.

BACKGROUND ART

U.S. Pat. No. 4,081,428 discloses the preparation of a high molecular weight linear poly(ester-amide) comprising the capping of a linear, hydroxyl-ended polyester by reaction with a diaryl ester of a dicarboxylic acid, in the presence of a catalyst, and reaction of the capped polyester with a diamine to form a poly(ester-amide). The poly(ester-amide) is a block copolymer having oligomeric amide chain segments. The examples show in each instance less than 5 mol % diamine component. The poly(ester-amides) are disclosed as useful for the manufacture of fibers by melt spinning.

DISCLOSURE OF THE INVENTION

This invention is a poly(ester-amide) comprising repeating units from at least one aliphatic dicarboxylic acid containing 5 to 12 carbon atoms, repeating units from at least one aliphatic glycol containing 2 to 12 carbon atoms, and repeating units from piperazine, the piperazine content of the poly(ester-amide) being about 30 to about 90 mol % based on the sum of the piperazine and glycol components totaling 100 mol %, provided that when over 50 mol % of repeating units from piperazine are used with repeating units from adipic acid, at least 20 mol % repeating units from another aliphatic dicarboxylic acid are present, the poly(ester-amide) being further characterized by a glass transition temperature of about 50° C. or less and an inherent viscosity of about 0.5 or more determined at 25° C. in a 60/40 by weight mixture of phenol/tetrachloroethane at a concentration of 0.5 g/100 ml.

Poly(ester-amides) of this invention preferably have a melting point of about 200° C. or less and a glass transition temperature below 50° C., preferably below 20° C., and most preferably below 0° C. It is preferred that the inherent viscosity be at least 0.9. Preferred acids are azelaic, adipic, or combinations thereof. Preferred glycols are ethylene glycol, 1,4-cyclohexanedimethanol or combinations thereof.

In the food packaging and beverage bottling industries, plastic film which can be shaped into containers by extrusion blow molding, forging, stretch blow molding, or other processes is highly desirable. These plastic containers not only must be strong but must have low permeability to gases, especially oxygen and/or carbon dioxide, in order to prevent spoilage of the contents of the package. In order to provide the optimum combination of properties in the most economical way, multiple-layer film structures may be produced by lamination, coextrusion, solution casting, or other such methods in which the layers may consist of different polymers or polymer blends chosen to impart specific desirable properties to the overall layered film. It is necessary that the layers of the film adhere to one another well, preferably when coextruded.

It is known that poly(ethylene terephthalate) (PET) modified with up to about 35 mol % of other diacids or glycols is particularly well suited to film extrusion and subsequent thermoforming processes, but the permeability to oxygen and carbon dioxide is high. It is also known that ethylene/vinyl alcohol (EVOH) (32/68 in particular) has excellent gas barrier characteristics.

The poly(ester-amides) of this invention are useful for making barrier material constructions suitable for packaging. This can be done with either pipe or flat film or blown film coextrusions.

One of the most economical means of improving the barrier properties of PET is with a multilayer structure in which a thin layer of EVOH is sandwiched between layers of PET.

These multiple-layer films of PET and EVOH have excellent gas barrier properties, but the two plastic materials do not form a natural bond and can be easily separated. The successful application of this coextrusion process requires the use of a tie layer to enable bonding of these two polymers.

The poly(ester-amides) of this invention have excellent adhesion to both polyesters and ethylene/vinyl alcohol copolymers and can be used as a coextrudable adhesive resin for use in the manufacture of multilayer packaging materials.

The piperazine-based poly(ester-amides) of the present invention are prepared by normal melt-phase polymerization techniques from piperazine, aliphatic dicarboxylic acids, and aliphatic glycols in the presence of a catalyst (preferrably a titanium compound).

To obtain the useful linear piperazine poly(ester-amides) having excellent adhesion to both polyesters and ethylene/vinyl alcohol copolymers, it is necessary that the polymers have melting points below 250° C. (preferably below 200° C.) and glass transition temperatures below 50° C., preferably below 20° C., and most preferably below 0° C. Those compositions with melting points greater than 250° C. or glass transition temperatures $\geq$ 50° C. can be used as adhesives for metals. The inherent viscosity of the poly(ester-amides) should be at least 0.5 and preferably at least 0.9.

The copoly(ester-amides) are prepared from one or more aliphatic dicarboxylic acids containing 5 to 12 carbon atoms. Examples of such acids are adipic acid, pimelic acid, suberic acid, azelaic acid, sebacic acid, 1,12-dodecanedioic acid, and glutaric acid. One or more methyl groups may be attached to the carbon chain of the dicarboxylic acid, e.g., 3-methyl adipic acid. Azelaic acid is the preferred acid, and preferably at least 25 mol % (dicarboxylic acids total 100 mol %) is present. The poly(ester-amides) can be modified with succinic acid.

The copoly(ester-amides) are prepared from one or more aliphatic glycols containing 2 to 12 carbon atoms. Among the glycols which can be used are ethylene glycol, 1,3-propanediol, 1,4-butanediol, neopentyl glycol, 1,6-hexanediol, 1,4-cyclohexanedimethanol, and diethylene glycol.

The glycol content of the poly(ester-amides) of this invention may be 10–70 mol %. The mol % of aliphatic glycol is based on the sum of the piperazine and glycol components totaling 100 mol %.

The poly(ester-amides) of this invention adhere well to polyesters such as poly(ethylene terephthalate)

(PET), PET modified with 1,4-cyclohexanedimethanol, and polyesters of terephthalic acid and 1,4-cyclohexanedimethanol. Also, the polymers adhere to poly(1,4-cyclohexylenedimethylene 1,4-cyclohexanedicarboxylate) and its copolymers, particularly with PTMG (polyoxytetramethylene glycol).

The poly(ester-amides) also adhere well to ethylene/vinyl alcohol copolymers, particularly where the vinyl alcohol content ranges from 50 to 80 mol %.

EXAMPLES

All inherent viscosities are determined at 25° C. in a (60/40 by weight) mixture of phenol/tetrachloroethane at a concentration of 0.5 g/100 mol. The melting points and glass transition temperature are determined with a Perkin-Elmer DSC-2 differential scanning calorimeter.

The following is a standard procedure for the preparation of the poly(ester-amides) of this invention. A mixture of 94 g (0.5 mol) azelaic acid, 36.4 g (0.25 mol) 1,4-cyclohexanedimethanol, 21.5 g (0.25 mol) 66.9% piperazine/water solution, and 1 mL of titanium tetraisopropoxide catalyst solution (0.019 g/Ti/mL) is placed in a 500-mL flask equipped with a stirrer and a short distillation head with inlet and outlet for nitrogen. The nitrogen outlet, which is connected to a receiver, has provision for applying vacuum. The flask is lowered into a Wood's metal bath maintained at 110° C. The mixture is stirred at 110° C. under a nitrogen atmosphere until most of the free water is given off (30 minutes). The bath temperature is then raised to 150° C. and maintained at this temperature for 60 minutes. The temperature is next raised to 200° C. and maintained at this level for 60 minutes. The bath temperature is finally raised to 275° C. and maintained at this temperature for 15 minutes. Vacuum (0.5 mm Hg) is then applied and stirring continued for about 120 minutes. A clear, light yellow polymer is obtained. The polymer has an inherent viscosity of 0.95, a glass transition temperature of −2° C., and a crystalline melting point of 48° C. NMR analysis of the polymer shows that the polymer contains 50 mol % piperazine.

Adhesive Bond Preparation and Testing

The same standard procedure as described above is used to prepare a series of poly(ester-amides). The T-peel strength of PET/EVOH laminates prepared with these polymers is shown in the following table.

The adhesive properties of resins are determined according to ASTM Procedure D1876 "Determination of T-Peel Strength of Adhesive or Otherwise Bonded Substrates." Extruded films with a thickness of 5 mils are used to prepare the laminates. The poly(ester-amides) (tie layer) are compression molded into films which are used to prepare a T-peel laminate on a PI Sentinel heat sealer at 350° F. The bottom film is a polyester (PET), the middle film the poly(ester-amide), and the top EVOH film is EVAL-F ®, which is copoly(32/68 ethylene/vinyl alcohol). Five specimens of each composition are prepared and tested. The peel strength (180° pull) is measured with an Instron tensile tester. The value quoted is an average of the five tests. Occasionally, the adhesive bond is stronger than the substrate and then the substrate either elongates or breaks at the bondline.

| Dicarboxylic Acid[a] | Glycol/-Piperazine[b] | I.V. | Tg, °C. | Tm, °C. | T-Peel, lb/in |
|---|---|---|---|---|---|
| Azelaic | 50/50 EG/P | 1.10 | −11 | 67 | 20.0 |
| Azelaic | 25/75 EG/P | 1.20 | −3 | 100 | 18.0 |
| Azelaic | 10/90 EG/P | 1.15 | 26 | 125 | [c] |
| Azelaic | 65/35 CHDM/P | 0.71 | −11 | 46 | 6.8 |
| Azelaic | 50/50 CHDM/P | 0.95 | −2 | 48 | 20.0 |
| Azelaic | 20/80 CHDM/P | 1.14 | 28 | 113 | [c] |
| Azelaic | 15/85 CHDM/P | 1.14 | 29 | 113 | [c] |
| Azelaic | 50/50 1,4-butanediol/P | 0.78 | [d] | 45 | 5.0 |
| Azelaic | 50/50 neopentyl glycol/P | 0.99 | −16 | 51 | [c] |
| 50/50 Azelaic/-Adipic | 65/35 CHDM/P | 0.53 | −8 | [d] | 5.2 |
| 50/50 Azelaic/-Adipic | 65/35 EG/P | 0.96 | −22 | [d] | 9.9 |
| 25/75 Azelaic/-Adipic | 65/35 EG/P | 0.59 | −22 | [d] | 5.0 |
| 50/50 Azelaic/-Adipic | 50/50 EG/P | 0.63 | −6 | 60 | 8.6 |
| Sebacic | 65/35 CHDM/P | 0.96 | −21 | 43 | 5.5 |
| Sebacic | 50/50 CHDM/P | 0.95 | −8 | 50 | 3.1 |
| Pimelic | 50/50 EG/P | 0.76 | 4 | [d] | 3.2 |
| Suberic | 50/50 EG/P | 1.05 | −14 | 47 | 5.5 |
| Suberic | 50/50 CHDM/P | 0.95 | −1 | [d] | 3.0 |
| Suberic | 65/35 1,6-hexanediol/P | 1.20 | −4 | 50 | 3.0 |
| 1,12-Dodecanedioic acid | 50/50 EG/P | 1.10 | −7 | 104 | 3.5 |
| Glutaric | 50/50 EG/P | 0.82 | 17 | [d] | 4.1 |
| Glutaric | 20/80 EG/P | 0.76 | 50 | 178 | [c] |
| Glutaric | 50/50 CHDM/P | 0.76 | 29 | [d] | 5.6 |
| 50/50 Adipic/-Succinic | 65/35 EG/P | 0.82 | 2 | 56 | 7.7 |
| 25/75 Adipic/-Succinic | 65/35 EG/P | 0.99 | 11 | [d] | 3.5 |

[a]Acids in the final polymer equal 100 mol %.
[b]Glycol/piperazine in the final polymer equal 100 mol %
EG = ethylene glycol
P = piperazine
CHDM = 30/70 cis/trans 1,4-cyclohexanedimethanol
[c]The film itself broke, but the bond did not fail.
[d]Not detected by DSC.

EXAMPLE 1

Five-layer pipe coextrusion was performed using poly(ethylene terephthalate) modified with 3.5 mol % 1,4-cyclohexanedimethanol as the polyester layers (outer and inner), a poly(ester-amide) consisting of poly(ethylene azelate) modified with 50 mol % piperazine (I.V. 1.2) was used as the tie layers, and a copolymer of ethylene-vinyl alcohol containing 65 mol % vinyl alcohol was used as the barrier layer to form the five-layer pipe. The layers of the pipe exhibited excellent appearance and the pipe was formed into a preform. The preform was then blown into a bottle. The bottle exhibited no delamination, even when pressurized with carbonated water.

EXAMPLE 2

Pipe coextrusion was performed as in Example 1 but substituting instead the following poly(ester-amides):
1. poly(1,4-cyclohexylenedimethylene azelate) modified with 50 mol % piperazine (I.V. 1.2);
2. poly(ethylene adipate) modified with 35 mol % piperazine (I.V. 0.85)
3. copoly(ethylene 75/25 adipate/azelate) modified with 35 mol % piperazine (I.V. 0.80)

Pipes using the above tie layers had excellent appearance and adhesion. Bottles made from the pipes also showed excellent bonding of the barrier layer to the polyester layers.

EXAMPLE 3

This example illustrates the use of a poly(ester-amide) prepared from adipic acid, 50 mol % piperazine, and 50 mol % 1,4-cyclohexanedimethanol as an adhesive for chrome-coated steel. Because of its high melting point, the polymer crystallizes during preparation. Its molecular weight may be increased to a sufficient value by heating particles of the polymer (ground to pass a 2-mm screen) under reduced pressure (0.1 mm Hg) at 220° C. for 4 hours. The polymer has an inherent viscosity of 0.99, glass transition temperature of 19° C. and crystalline melting point of 310° C. Bonds are prepared according to the following procedure.

Chrome-coated steel specimens (1×5 in) are cleaned by washing three times with a detergent solution of Alconox (Alconox, Inc.) and rinsing in water each time. The specimens are then rinsed in acetone and allowed to dry in the air. A hot plate whose surface temperature can be adjusted to 320° C. is used to heat the specimens for bond formation. For tensile shear tests, the molten polymer is evenly spread on the heated specimen over a 0.25 in. length with a wooden spatula. The second coated specimen is pressed against the sample, and then the laminated sample is turned over on the hot plate with the second specimen against the hot plate surface. Heating is continued while the wooden spatula is rubbed back and forth over the adhesive area until a smooth, even glue line is obtained. Glue lines are about 5 mils in thickness. The tensile shear strengths are measured with an Instron tensile tester by the general method of ASTM D1002-64 but using the precut specimens. A tensile shear strength of 990 psi is obtained.

The invention has been described in detail with particular reference to preferred embodiments thereof, but it will be understood that variations and modifications can be effected within the spirit and scope of the invention.

I claim:

1. A poly(ester-amide) comprising repeating units from at least one aliphatic dicarboxylic acid containing 5 to 12 carbon atoms, repeating units from at least one aliphatic glycol containing 2 to 12 carbon atoms, and repeating units from piperazine, the piperazine content of the poly(ester-amide) being 30 to 90 mol % based on the sum of the piperazine and glycol components totaling 100 mol %, provided that when over 50 mol % of repeating units from piperazine are used with repeating units from adipic acid, at least 20 mol % repeating units from another aliphatic dicarboxylic acid are present, said poly(ester-amide) being further characterized by a glass transition temperature of about 50° C. or less and an inherent viscosity of about 0.5 or more determined at 25° C. in a 60/40 by weight mixture of phenol/tetrachloroethane at a concentration of 0.5 g/100 mL.

2. Poly(ester-amide) of claim 1 wherein said glass transition temperature is less than 20° C.

3. Poly(ester-amide) of claim 1 wherein said glass transition temperature is less than 0° C.

4. Poly(ester-amide) of claim 1 having a melting point of about 200° C. or less.

5. Poly(ester-amide) of claim 1 wherein said inherent viscosity is at least 0.9.

6. Poly(ester-amide) of claim 1 wherein said repeating units from said acid are from azelaic acid.

7. Poly(ester-amide) of claim 1 wherein said repeating units from said acid are from adipic acid.

8. Poly(ester-amide) of claim 1 wherein said repeating units from said acid are from both azelaic and adipic acid.

9. Poly(ester-amide) of claim 1 wherein said repeating units from said glycol are from 1,4-cyclohexanedimethanol.

10. Poly(ester-amide) of claim 1 wherein said repeating units from said glycol are from ethylene glycol.

11. Poly(ester-amide) of claim 1 wherein said repeating units from said acid are from azelaic acid and said repeating units from said glycol are from ethylene glycol.

12. Poly(ester-amide) of claim 1 wherein said repeating units from said acid are from azelaic acid and said repeating units from said glycol are from 1,4-cyclohexanedimethanol.

* * * * *